United States Patent
Fogelberg

[11] Patent Number: 5,884,526
[45] Date of Patent: Mar. 23, 1999

[54] ACTUATOR FOR TRANSFER CASE

[75] Inventor: Mark J. Fogelberg, Milwaukie, Oreg.

[73] Assignee: Warn Industries, Inc., Milwaukie, Oreg.

[21] Appl. No.: 721,819

[22] Filed: Sep. 27, 1996

[51] Int. Cl.$^6$ .................................................. F16H 63/04
[52] U.S. Cl. ........................... 74/335; 74/89.17; 74/422; 74/473 R; 74/665 T; 192/82 P; 192/84.6; 475/295
[58] Field of Search ......................... 74/422, 335, 473 R, 74/89.17, 665 G, 665 GA, 665 T; 475/151, 199, 204, 295, 332; 192/82 P, 84.6, 12 B, 3.52, 69.91

[56] References Cited

U.S. PATENT DOCUMENTS

| | | | |
|---|---|---|---|
| 2,061,990 | 11/1936 | Tyler | 192/82 P |
| 2,920,501 | 1/1960 | Couch | 74/422 |
| 3,827,520 | 8/1974 | Mueller . | |
| 4,546,668 | 10/1985 | Mattsson | 74/422 |
| 4,570,765 | 2/1986 | Makita | 74/335 |
| 4,667,767 | 5/1987 | Shea et al. | 180/247 |
| 4,846,010 | 7/1989 | Fujikawa et al. | 74/335 |
| 4,854,413 | 8/1989 | Kameda et al. | 180/247 |
| 4,883,138 | 11/1989 | Kameda et al. | 180/249 |
| 5,247,847 | 9/1993 | Gu | 74/422 |
| 5,323,871 | 6/1994 | Wilson et al. | 180/197 |
| 5,330,030 | 7/1994 | Eastman et al. | 180/233 |
| 5,332,060 | 7/1994 | Sperduti et al. | 180/197 |

*Primary Examiner*—Charles A. Marmor
*Assistant Examiner*—Sherry Lynn Estremsky
*Attorney, Agent, or Firm*—Robert L. Harrington

[57] ABSTRACT

A transfer case for a vehicle having two output shafts, a gear reduction assembly, a coupling mechanism and an overrunning roller clutch for selectively producing driving of one shaft only or both shafts concurrently. The coupling mechanism selectively couples one output shaft to either (1) an input shaft, (2) the gear reduction assembly, or (3) a neutral position. The overrunning clutch has an inner race, an outer race, and rollers located between the races. Drag shoes are positioned to frictionally slide on a drag surface of a selectively grounded member to retard the rollers. A resilient band urges the drag shoes against the drag surface. When the drag shoes rotate at a sufficient speed they disengage from the drag surface so as to provide no force to retard the rollers. When the ground member is grounded it provides the drag surface for the drag shoes. When the ground member is ungrounded it is free to rotate and the drag shoes do not provide a drag force to bias the rollers. A latch may be coupled to the inner race to engage a roller cage to prevent high speed lock-up. A drag ring is located inside the outer race and provides a drag force on the rollers to advance the rollers when it is desired, e.g., when front wheel compression braking is advantageous. An actuator assembly is provided with a variable speed drive for shifting the transfer case between modes of operation.

28 Claims, 6 Drawing Sheets

ACTUATOR FOR TRANSFER CASE

BACKGROUND OF THE INVENTION

1. Field of the Invention

This invention pertains to transfer cases in vehicles having multiple drive modes, and more particularly pertains to transfer cases having an actuator for shifting between drive modes.

2. Description of the Related Art

Four-wheel drive vehicles generally incorporate some manner of transfer case by which torque from a single output shaft from a power source is transferred to two output shafts for driving separate axles of a vehicle. In a standard configuration of a four-wheel drive vehicle the rear wheels constantly receive torque from the power source and the front wheels receive torque selectively, for example, "on-demand," when the rear wheels slip, or "part-time," when an operator shifts the transfer case to four-wheel drive mode.

Various transfer case designs address different vehicle operating conditions and requirements. One style of transfer case incorporates an input shaft having a splined end, and a fixedly attached sun gear that cooperates with a planetary gear assembly. A shifting mechanism couples one output shaft to the planetary gear assembly or directly to the input shaft to provide different ranges of operation (e.g., low range, high range). That one output shaft may then be selectively coupled to a second output shaft to transfer torque thereto.

One method of transferring torque between output shafts uses an overrunning roller clutch. Such a transfer case is shown in Fogelberg U.S. Pat. No. 4,124,085. Basic roller clutch design is known in the art.

The basic design of a roller clutch, without the overrunning feature, has concentric races with rollers (preferably needle rollers) located between the races. One of the races (typically the inner race) has a plurality of cam surfaces for engaging the rollers and thus is designated the driving race or driving member. When either race rotates faster than the other, the rollers jam (i.e., lock) the cams and the driven race, thus engaging the clutch to transfer torque. Each roller can lock in one of two positions: a "retarded" position, that is at a trailing edge of a cam surface or an "advanced" position located at a leading edge of each cam surface.

In an overrunning clutch, the rollers are biased into a retarded position, that is biased opposite the direction of rotation, by a drag member. This allows the driven member to overrun the driving member without engaging the rollers bearings on the cams. However, when the driving member begins to overrun the driven member, the rollers quickly engage and torque from the driving member is transfered to the driven member.

Drag members add inefficiency to the roller clutch assembly because the drag forces reduce fuel efficiency and generate substantial heat, particularly during high speed operation. That heat requires the use of specific materials that can withstand the friction and high temperatures for long periods of time. Typically, such materials are more expensive than less wear-resistant and heat-resistant materials.

Sometimes the driven member can overrun sufficiently to overcome the force that retards the rollers. The rollers then advance, that is progress forward in the same direction of rotation as the races. If the rollers advance sufficiently, they can engage the cams so that the driven member actually drives the other (defeating the overrun feature). If this occurs, the clutch can lock up and remain in the engaged configuration even when the driven member is not trying to overrun the driving member. This condition causes an awkward driving experience.

SUMMARY OF THE INVENTION

The transfer case of the present invention is provided with high and low ranges of operation for different environmental conditions. A neutral position is also provided wherein the output shafts are not engaged to the input shaft. The transfer case is shifted between these positions (high-neutral-low) by an actuator assembly that includes a compliant shift fork that is moved by a variable speed shift rail. The shift rail is driven by a pin drive mechanism that is rotated at a substantially constant velocity by a motor. Due to the relationship between the pin drive and the shift rail, the constant rotational velocity of the pin drive moves the shift rail at variable speeds, faster between positions and slower proximate to the positions. This variable speed drive allows more precise positioning of the shift fork and less complicated position sensors and motor controllers.

Various advantages and features of novelty which characterize the invention are particularized in the claims forming a part hereof. However, for a better understanding of the invention and its advantages, refer to the drawings and the accompanying description in which preferred embodiments of the invention are illustrated and described.

DETAILED DESCRIPTION OF THE PREFERRED EMBODIMENTS

Vehicles having multiple drive axles, e.g., 4-wheel drive vehicles, need to divide torque from a common power source to front and rear axles of the vehicle. The division, or allocation, of torque between the front and rear wheels from the power source is accomplished by a transfer case.

Figure 1:
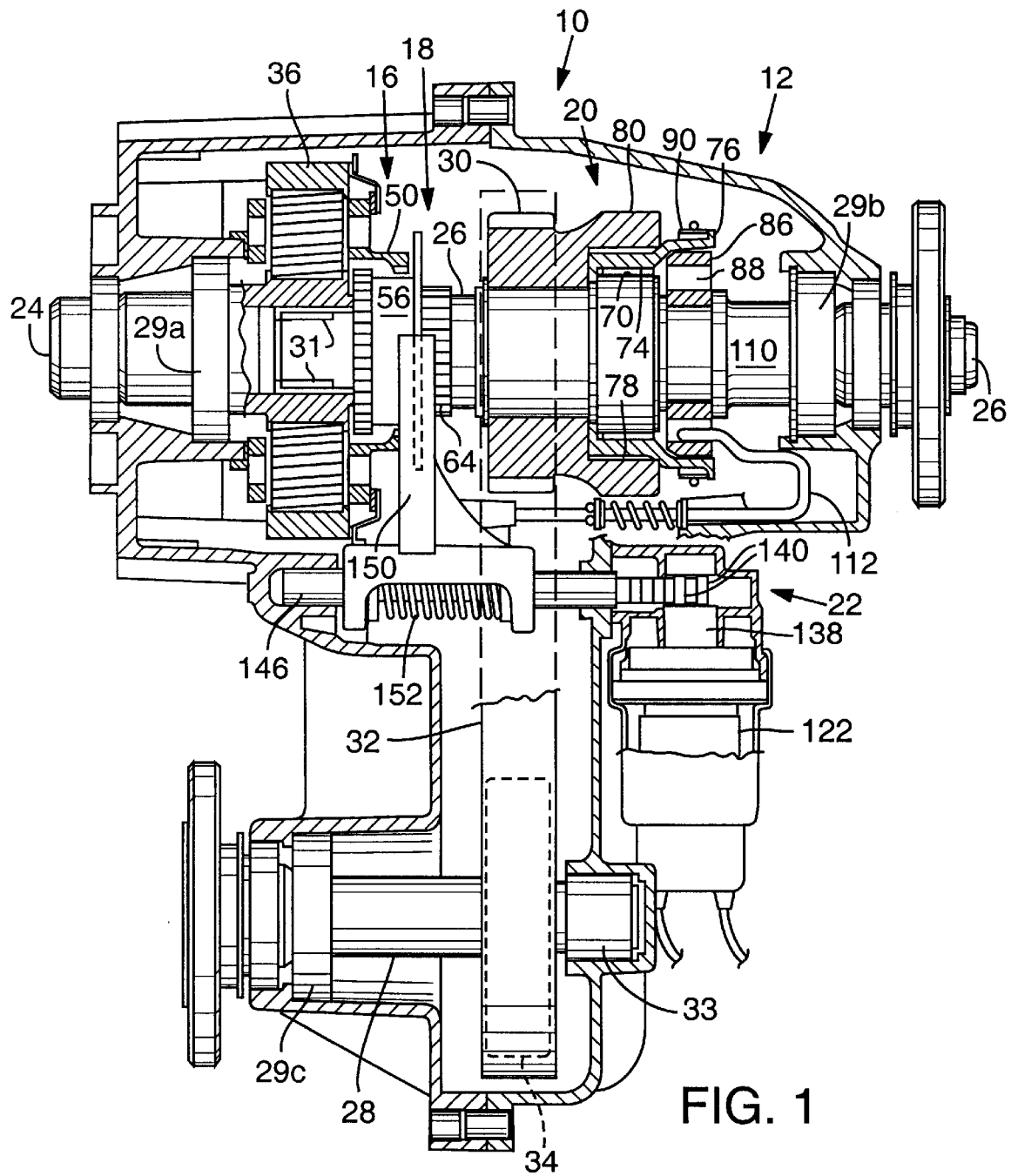
FIG. 1 is a cross-sectional view of a preferred embodiment of a transfer case of the present invention in a first operating condition.

FIG. 1 shows an exemplary embodiment of the present invention. A transfer case 10 has a housing 12 that covers a gear reduction assembly 16, a coupling mechanism 18, a roller clutch assembly 20, and an actuator mechanism 22. An input shaft 24 receives power from a power source, such as a motor-driven transmission, and delivers torque into the transfer case. A first output shaft 26, substantially in line with the input shaft 24, is selectively coupled to the input shaft 24 or the gear reduction assembly 16 by the coupler mechanism 18. In a preferred embodiment, the first output shaft 26 will transmit torque to a rear axle of a vehicle.

The roller clutch 20 selectively couples the first output shaft to a second output shaft 28. A sprocket 30 is formed in a portion of the roller clutch 20 and is coupled through a drive chain 32 to a second sprocket 34 to complete power transfer to the second output shaft 28.

A ball bearing assembly 29a and roller bearing assembly 31 support the input shaft 24. The first output shaft 26 is supported by ball bearing assembly 29b adjacent the output end 26a of shaft 26 and the roller bearing 31 assembly adjacent the input end 26b. A ball bearing assembly 29c and needle bearing assembly 33 support the second output shaft 28. Input shaft 24 and output shaft 26 are rotatable either independently or in conjunction with each other.

The input shaft 24 receives torque from a power source (not shown) and rotates within the housing 12 and drives the gear reduction assembly 16. The coupler mechanism 18 is always coupled to the first output shaft 26 and selectively couples to the input shaft 24 or to the gear reduction assembly 16 or idles therebetween in neutral. When the first output shaft 26 is coupled to the input shaft 24, the transfer case is in high range. When the first output shaft 26 is coupled to the gear reduction assembly 16, the transfer case is in low range. The transfer case is in neutral when the coupling mechanism is connected to neither the input shaft nor the gear reduction assembly. The coupling mechanism 18 is shifted by the actuator assembly 22.

When the roller clutch 20 is engaged, the first output shaft 26 drives the second output shaft 28 via the chain-sprocket combination 30, 32, 34.

The components of the transfer case 10 are explained in greater detail below.

Gear Reduction Assembly

In its preferred embodiment, the gear reduction assembly 16 comprises a helical planetary gear assembly 36, which includes a sun gear 38, a plurality of planet gears 40, and a fixed ring gear 42. The planet gears 40 are rotatably supported on a floating carrier 44. In the exemplary embodiment, the planetary gear 36 includes four planet gears 40. The helical sun gear 38 is formed on, or fixedly secured to, the input shaft 24. The sun gear 38 is meshingly engaged with helical planet gears 40, which, in turn, are meshingly engaged with the fixed, helical ring gear 42. Rotation of the sun gear 38 rotates the planet gears 40 which engage the ring gear 42. Because the ring gear is fixed, the planet gears walk around the inside of the ring gear thus moving the carrier 44 so that the carrier rotates about the axis of rotation of the input shaft.

Thrust plates (or rings) 46, 48 prevent the carrier from moving axially under loads created by driving the helically threaded gears. The thrust plate 46 is annular and is coupled to the housing 12 by a retaining ring 46a and presses against the fixed ring gear 42. Structurally, the thrust plate 46 includes substantially flat outer and inner disk portions 46b and 46c respectively with a conical portion 46d intermediate the disk portions. An inner margin of the thrust plate 46 is coupled to a low-friction ring 46e that presses against the carrier 44. The thrust plate 48 is annular and is positioned directly between the carrier and the housing. Thus the thrust plates 46 and 48 retain the carrier 44 without substantially inhibiting the carrier's rotation. Preferably the thrust plate is fabricated of steel and the low-friction rings are a self-lubricating bearing material, such as nylon.

The carrier 44 includes an internally splined extension 50 with spline teeth 50a for connection to the coupling mechanism 18 as described below. When the input shaft 24 drives the planet gears 40, and hence the carrier 44, the carrier rotates at a lower rotational velocity than the input shaft. Preferably, the gear ratio is in a range of approximately 2.5 to 1 to 3.0 to 1.

The input shaft 24 also includes an externally splined portion 52 that can directly couple to the coupling mechanism 18 for directly driving the output shaft 26. Because the splined portion 52 is part of the input shaft 24, it rotates at the same speed as the input shaft.

Accordingly, when the output shaft 26 is coupled to the gear reduction assembly 16, the output shaft 26 rotates at a slower rotational velocity than the input shaft 24. However, when the output shaft 26 is coupled to the input shaft 24 (at its splined portion 52), the input shaft and output shaft rotate at the same speed.

Coupling Mechanism

The coupling mechanism 18 is shiftable to couple the first output shaft 26 either to the input shaft 24 (high range) or the gear reduction assembly 16 (low range), or to decouple the first output shaft from both (neutral). The coupling mechanism comprises a collar 56 having a radially extending flange 58. The collar 56 includes an internal splined surface 60 that is received on an externally splined portion 64 of the first output shaft 26. Because the connection between the collar and the first output shaft is a splined connection, the collar is free to translate axially along the first output shaft, but rotates with the first output shaft. The internal splined surface 60 also is configured to be received in a splined engaging condition on the splined portion 52 of the input shaft 24.

The collar 56 also includes an externally splined portion 62 adapted, when appropriately positioned, to couple to the splined carrier extension 50.

In FIG. 1, collar 56 is illustrated shifted to the left to engage the input shaft's splined portion 52 and the output shaft's splined portion 64, thus directly coupling the input shaft 24 to the output shaft. This is the high range drive mode.

Figure 2:
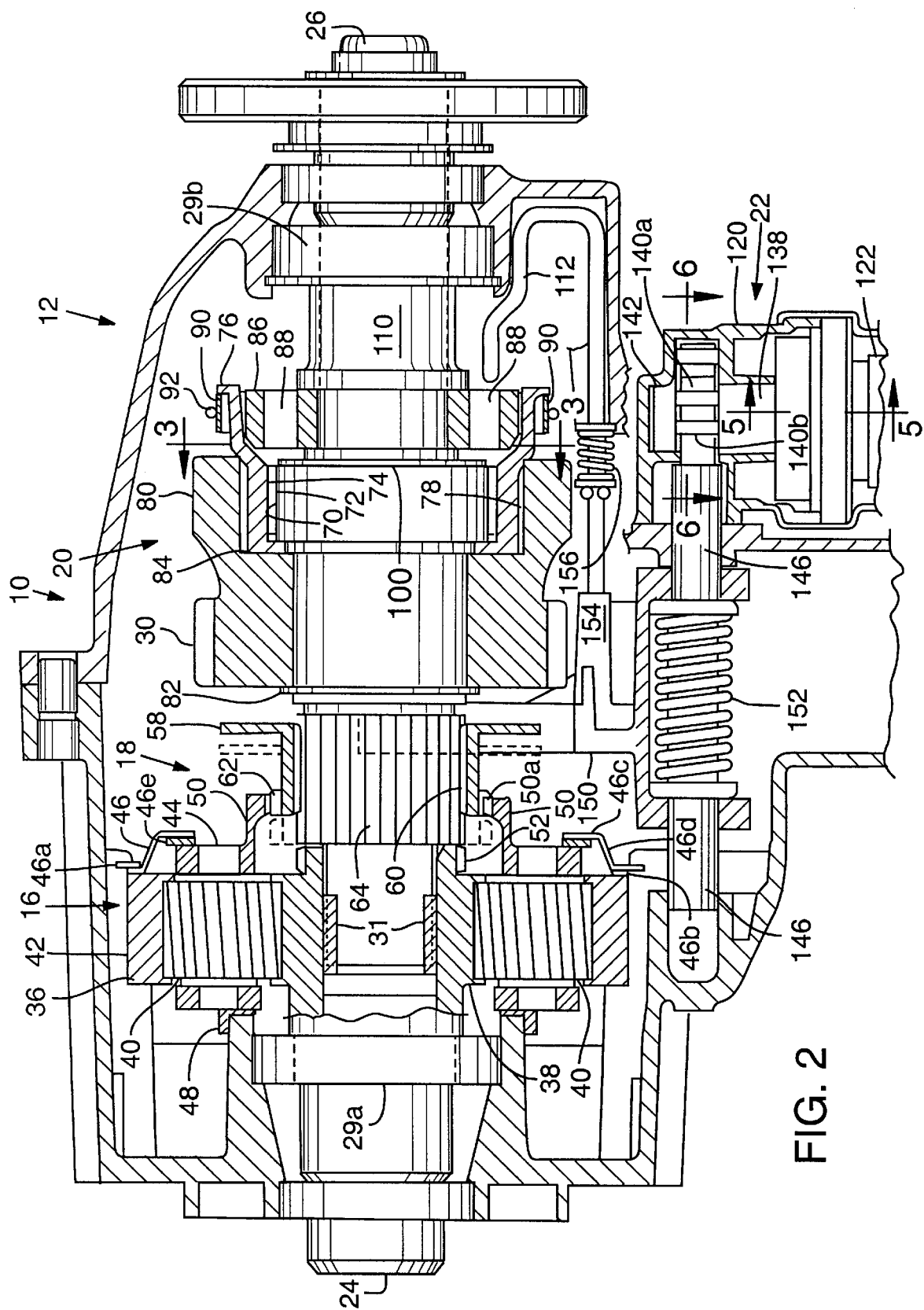
FIG. 2 is an enlarged cross-sectional view of a portion of the transfer case of FIG. 1 in a second operating condition.

In FIG. 2, the collar 56 is shown shifted to the right in the drawing whereby splined portion 62 engages the splined carrier extension 50. Accordingly, the output shaft 26 is coupled to the input shaft 24 via the gear reduction assembly 16. In this mode, the output shaft rotates at the speed of carrier 44, and thus slower than the input shaft. This is low range mode.

The coupling mechanism 18 also has a neutral position (shown partially in dashed outline in FIG. 2) in which the collar 56 is not engaged with either the carrier spline extension 50, or the spline connection 52 of the input shaft 24. When in neutral, neither output shaft 26, 28 receives torque from the power source.

Alternative configurations exist for the gear reduction assembly and the coupling mechanism. For example, spur gears may be used in the planetary gear or the coupling device could interface with the input shaft or gear assembly differently.

Roller Clutch

The roller clutch assembly 20 includes an inner race 70 that is formed on, or affixed to, a portion of a surface of the first output shaft 26. As the driving member of the roller clutch, the inner race 70 has a plurality of cam surfaces 71 (FIG. 3b) for engaging a respective number of rollers, or needle rollers, 72. Preferably, the cam surfaces are flat, but other configurations may also be suitable.

Figure 8:
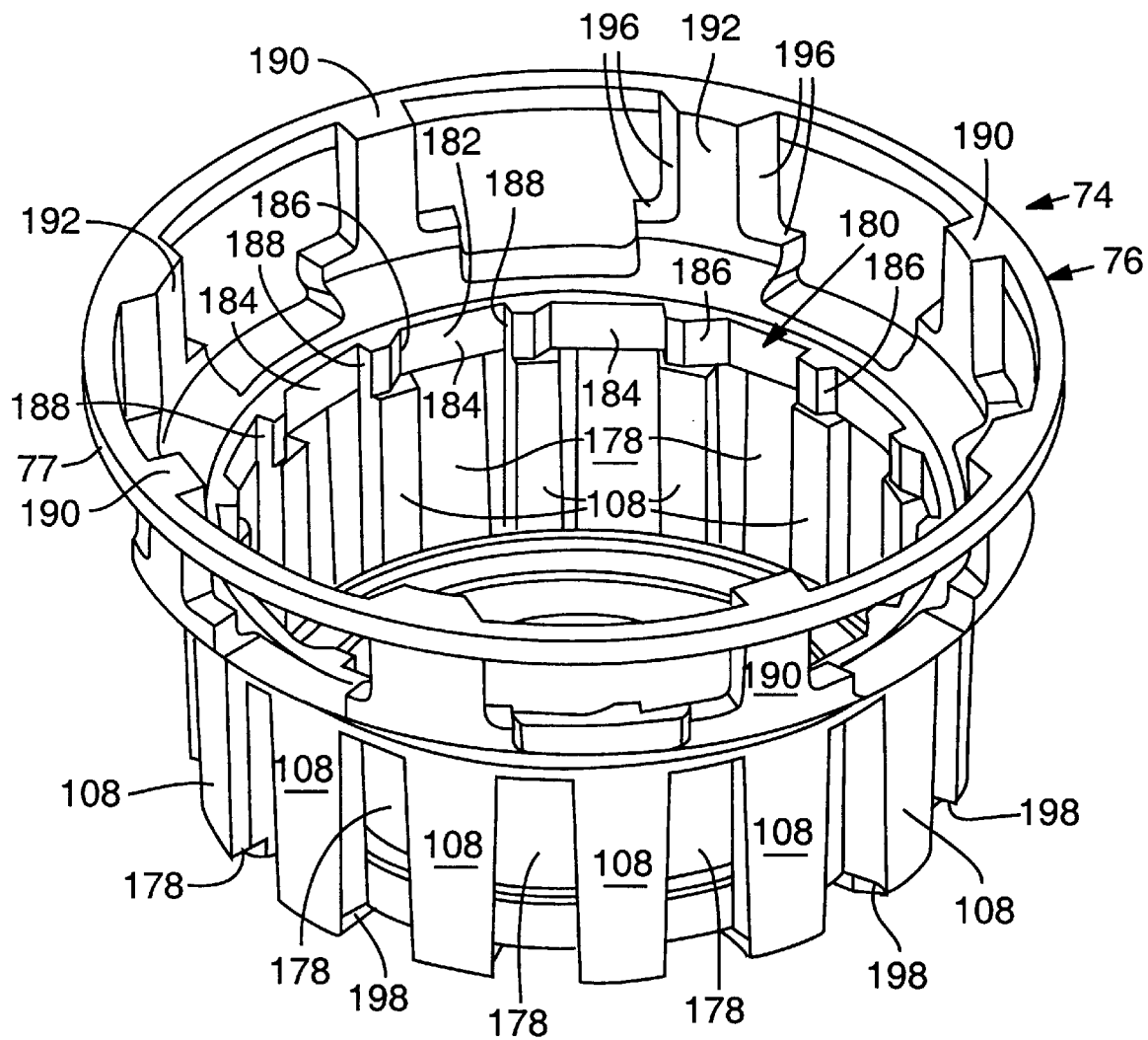
FIG. 8 is a perspective view of a roller bearing cage of the present invention.

The rollers are maintained in position by a roller cage 74 (FIGS. 1, 2, 3 and 8) that extends circumferentially around the inner race 70 and extends axially outward, forming a skirt 76 having an end ring 77. With reference to FIG. 8, the roller cage further includes roller openings 178 separated by tangs 108. At one end of the openings 178 and tangs 108 is an index ring 180 that comprises beveled keyways 182 having semi-circular keys 184 terminated by beveled ends 186 and stop ends 188. Alternately to the beveled ends 186, the keyway 184 could have stops at each end and be sized sufficiently to accommodate movement of the latch as described below.

Preferably, the cage 74 also includes shoe retention legs 190 and shoe separators 192 for retaining and positioning drag shoes 90 as described below. Respective margins 194, 196 of the legs and separators are beveled to assist with shoe retention and positioning.

The cage may further be provided with an annular notch 198 for receiving a drag ring 84, described below.

An outer race 78 is formed along an interior surface of an extension 80 of the sprocket 30. The sprocket 30 is journaled for rotation on the first output shaft 26 and held in position by a retention ring 82. Preferably, the outer race 78, in this embodiment, is substantially cylindrical, having no cam surfaces thereon.

Located radially inward of the outer race 78, and in contact with the outer race and the cage 74, is a drag ring 84. Preferably, the drag ring 84 is a resilient ring located on the roller cage 74 and in contact with the outer race 78.

Located adjacent, but outside, the races 70, 78 is an annular friction ground 86 that is journaled on the first output shaft 26. The friction ground includes a plurality of circumferentially located pockets 88 for receiving a locking device 112, as identified below. A suitable material for the friction ground is powdered metal (steel).

Located radially outward of the friction ground 86 are a plurality of drag shoes 90 that can press against, and ride on, the friction ground 86. The shoes are coupled to the skirt 76 to be held generally in place and so that drag forces on the drag shoes are transferred to the rollers 72 by the cage. The drag shoes are substantially semi-circular and extend through an approximate quarter circle arc. Preferably, the drag shoes 90 are provided with a saddle 91 that is positioned radially inward of a respective shoe retainer leg 190 (FIG. 4b). Each shoe terminates proximate a respective shoe separator 192. The shoes 90 may be provided with beveled ends that are compatible with the beveled margins 196 of the separators 192.

In cross-section profile (FIG. 4), the drag shoes have a drag surface 200 and upper surface 202. The shoe drag surface 200 slides on the a ground member 86 as described below. The upper surface 202 is positioned radially inward of cage skirt 76. Preferably, there are four shoes located circumferentially about the friction ground 86. A suitable material for the drag shoes 90 is carbon-filled polyphenylene sulfide with PTFE.

A garter spring 92 is located about the drag shoes 90 thus urging them radially inwardly against the drag surface 96 of the friction ground 86. As best noted in the detail of FIG. 4, there is a gap 94 between the drag shoes 90 and the skirt 76. This gap allows the drag shoes 90 to be moved away from the friction ground 86 at high RPM, but not to be released totally from the system.

When the friction ground 86 is grounded, that is, held stationary with respect to the housing 12, an annular outer surface 96 of the friction ground provides a drag surface for the shoes 90. When the shoes ride on the drag surface 96 a drag force is created that is transfered to the roller cage 74. When the first output shaft 26 rotates (and hence the roller clutch and drag shoes 90 are rotated) at a sufficient rotational speed, centrifugal force urges the drag shoes radially outwardly against the radially inwardly directed biasing force of the spring 92. At a preselected speed, determined primarily by the mass of the shoes and the force of the spring 92, the shoes are urged radially outward away from the drag surface 96 thus reducing or eliminating the drag force. The gap 94 allows such movement.

In a preferred embodiment the drag shoes 90 and garter spring 92 are designed so that the drag shoes unload from the friction ground at approximately 80 miles/hour. It has been determined that unloading can occur at this speed by selecting the following approximate parameters: Four, quarter-circle drag shoes 90 weighing 0.0126 pounds each and having a drag surface that is 0.668 square inches. A coefficient of friction between the drag shoes 90 and the friction ground is approximately 0.11. The garter spring 92 has a free length of 8.553 inches, an installed length of 13.512 inches and an initial tension of 0.736 pounds. The friction ground has an outside diameter of 3.467 inches. These parameters are suitable in a system having an axle ratio of approximately 3.73 to 1.00. As the shoes wear, it is expected that the speed at which the shoes unload from the friction ground will increase by five to eight miles per hour.

The operation of the variable force drag shoes is explained in greater detail below.

In a preferred embodiment of the roller clutch assembly 20 of the present invention, there is a latch 100 (FIGS. 2 and 3a) that is indexed to the inner race 70 by means of a flat 102 (alternatively keyways could be used) so that the latch 100 rotates with the first output shaft 26. The latch 100 includes a latch plate 103 having loosely coupled latch arms 104 that can move radially outward under centrifugal force when the output shaft 26 is rotating at sufficient speed.

The latch arms 104 are held on the plate 103 by retention wings 105 located at ends 106 of the latch arms. The latch arms 104 are free to move along the plane of the plate 103, but are prevented from leaving the plane of the plate by the retention wings 105. Retention springs 107 are coupled to the retention wings 105 and press against the latch arms 104 to bias the arms radially inward and to guide the motion of the arms into the desired radial motion when the latch is subjected to centrifugal force. The latch arms 104 further include tabs 109 that are configured to engage the semi-circular keyway 180 of the roller cage 74. The operation of the latch 100 is described below.

Figure 3A:
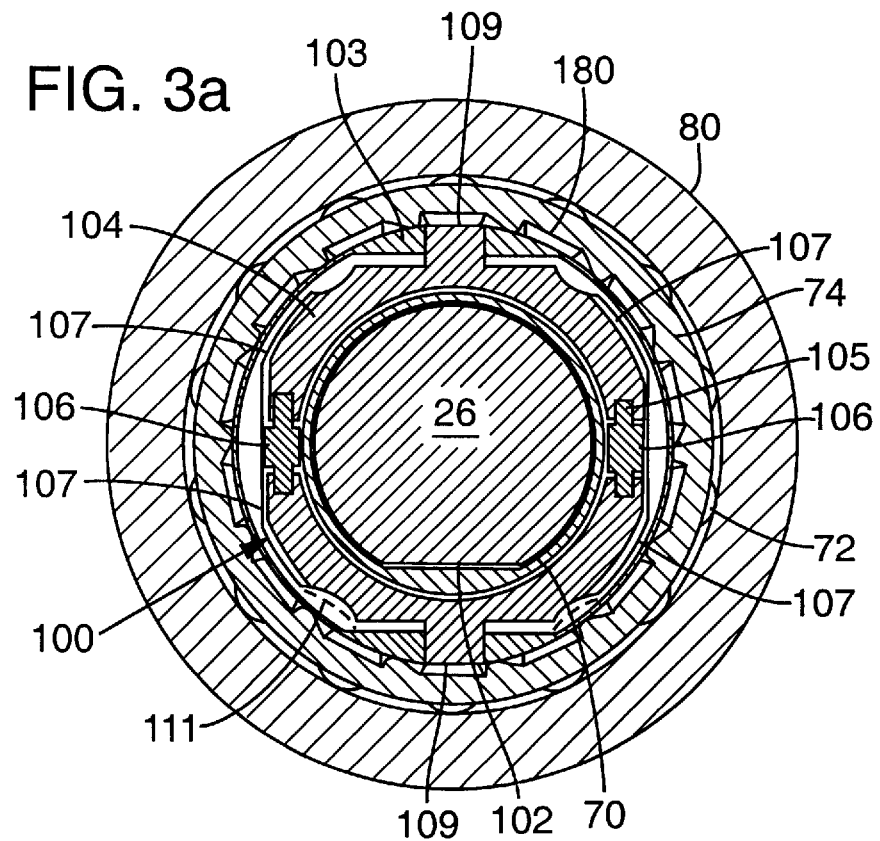
FIGS. 3a and 3b are enlarged cross sectional views taken along line 3—3 of FIG. 2 showing two embodiments of a latch.
Figure 3B:
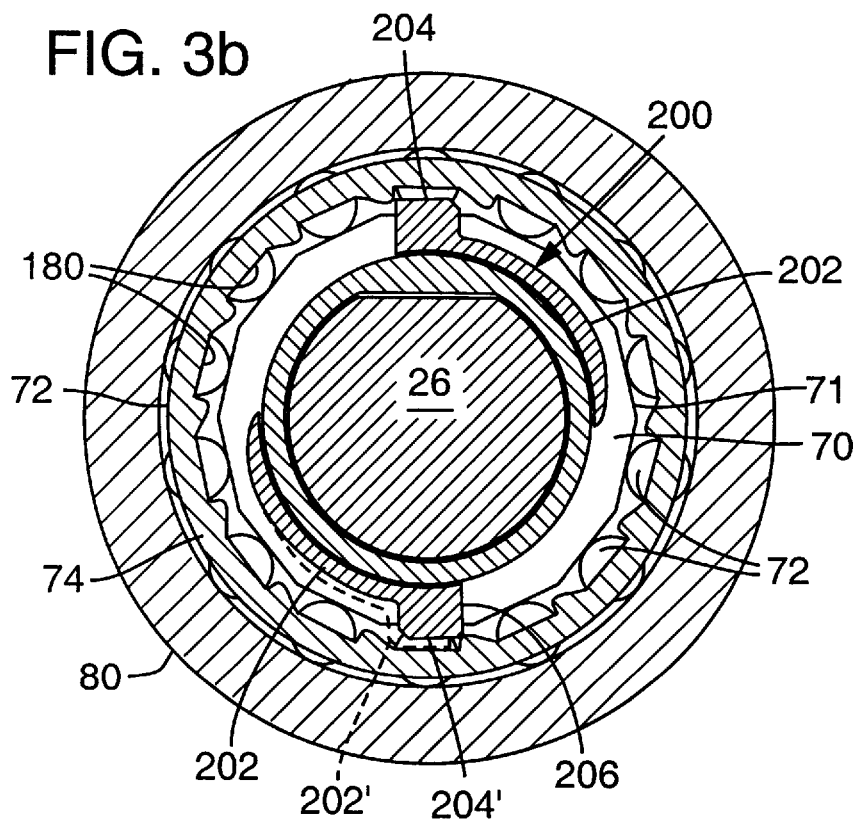

In an alternative embodiment shown in FIG. 3b, the latch 200 includes thin, flexible arms 202 that extend circumferentially part-way around the perimeter of the latch. Fingers 204 are located at distal ends of the arms. The fingers 204 are sized to fit within the keyways 180. The arms 202 are flexible so that when the latch 200 rotates at sufficient velocity, the arms 202 are urged outward and the fingers 204 engage the keyways 180, as shown in dotted lines in FIG. 3b at 202' and 204'.

When the latch 100 (or 200) is engaged, the cage 74 is coupled to the inner race 70 (and thus to the first output shaft 26). The purpose and effect of this latch mechanism will be described below in regard to the operation of the transfer case.

Alternative latch designs are contemplated. For example, the latch could comprise spokes that slide radially outward under centrifugal forces.

A spacer 110 (FIG. 2) is mounted between the bearing 29b and the friction ground 86 to act as a thrust race against axial movement of the friction ground 86 and the roller clutch assembly 20.

The friction ground may be selectively grounded. That is, the friction ground 86 may be grounded so that it does not rotate relative to the housing 12, or it may be ungrounded so that it rotates with the output shaft 26. When grounded, the friction ground 86 provides the stationary drag surface 96 upon which the shoes 90 drag to bias the roller cage and rollers 72. When ungrounded, the friction ground 86 rotates with the first output shaft 26 and therefore does not bias the rollers in a retarding direction.

A locking hook 112 (FIGS. 1 and 2) is shiftable axially within the housing to engage or disengage the friction ground 86. In FIG. 1, hook 112 is shown engaging a pocket 88 of the friction ground 86 to ground the friction ground so that it does not rotate relative to the housing 12. In FIG. 2, the locking hook 112 is shown disengaged, or withdrawn, from the pockets 88 of the friction ground, thus ungrounding the friction ground and allowing it to rotate relative to housing 12. The locking hook 112 is controlled by the position of the actuator mechanism 22 as will be described in greater detail below.

Actuator Mechanism

As noted above, the coupling mechanism 18 moves, or is shiftable, between (a) high range, (b) low range, and (c) a neutral position to engage to the first output shaft 26 (a) directly to the input shaft, (b) to the planetary gear carrier 44, or (c) to an idle position therebetween, respectively. Movement of the coupling mechanism collar 56 is accomplished by the actuator mechanism 22.

Figure 5:
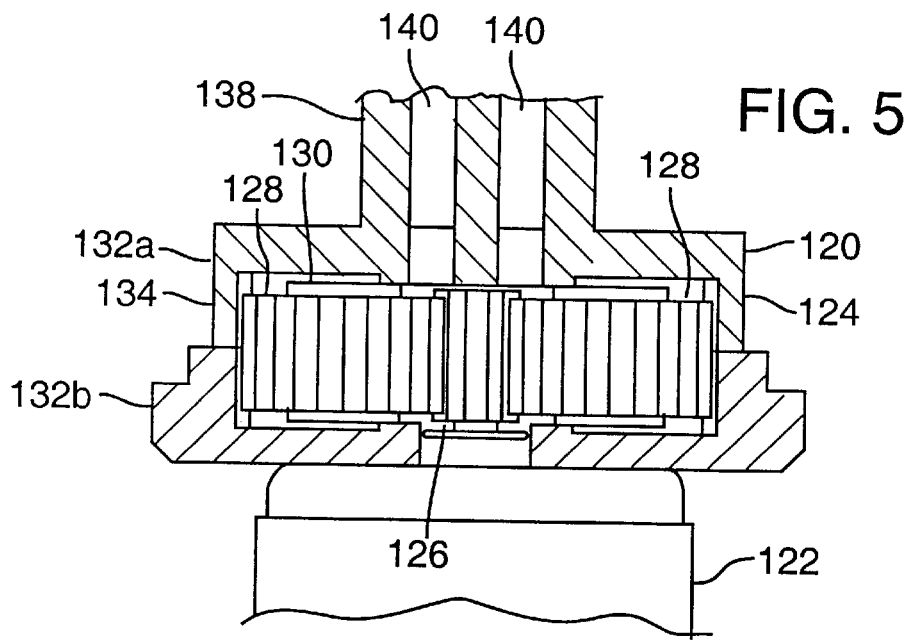
FIG. 5 is an enlarged cross-sectional view taken on line 5—5 of FIG. 2.

The actuator mechanism includes a power source 122, such as an electric motor, and a planetary gear drive 124 (FIG. 5). The power source 122 is arranged to drive a sun gear 126 that meshingly engages a plurality of planet gears 128 that are journaled on a floating carrier 130. In meshing engagement with the planet gears 128 are outer annular rings 132a and 132b. The annular ring 132b is fixed to the power source 122 (or a housing thereof). The annular ring 132a is floating, that is not fixed, and is coupled to a pin drive device 138 having, preferably, two drive pins 140a and 140b (collectively 140) that terminate in a cap that is supported by a bearing 142 within the housing (FIG. 2). The annular rings 132a and 132b are provided with teeth along an inner surface thereof for engaging the planet gears 128. However the annular rings 132a and 132b have a different number of teeth so that as the planet gears and carrier 130 walk around the inside of the annular rings 132a and 132b, the floating annular ring 132a is forced to rotate thus moving the pin drive device.

The drive pins 140a and 140b engage notches 144 formed in an elongate shift rail 146 that is slidingly supported in the housing 12. Accordingly, as the power source drives the planetary gear 124, the pin drive device 138 rotates about an axis of rotation 148 and the drive pins 140a and 140b translate about the axis of rotation, as can best be seen in FIGS. 6a–6c. The rotation of the pin drive device 138 engages the shift rail 146 and causes it to translate along its longitudinal axis.

Although not shown, a preferred embodiment of the actuator assembly 22 includes a rotational position sensor to monitor the drive pin device rotation and deenergize the motor when the actuator reaches desired positions.

The shift rail is compliantly coupled to a shift fork 150 by means of a compliance spring 152. The shift fork extends upward and couples to the flange 58 of collar 56 so that translation movement of the shift fork 150 likewise causes the collar 56 to translate into the various positions corresponding with the high range, low range, and neutral positions. The compliant coupling between the shift rail 146 and the shift fork 150 produced by spring 152 permits relative movement between the shift rail and the shift fork when the collar is not able to slide freely. For example, if the collar 56 is blocked from sliding when the shift rail 146 moves, the compression spring 152 will be compressed and provide a force against the shift fork 150 which, in turn, will provide a force against the collar 56, urging it to move. When the splines (e.g., spline portions 52 and 60 for example) are properly aligned the spring force will cause the collar to move.

The shift fork 150 also connects to the locking hook 112 at a hook receptacle 154. With reference to the orientation of FIG. 2, it can be seen that movement of the shift fork 150 to the right will push against the locking hook 112, moving it out of engagement with the friction ground 86. Conversely, when the shift fork 150 moves to the left, a biasing spring 156 urges the locking hook 112 to move to the left and, when the hook is properly aligned with a pocket 88, it will enter the pocket, thereby grounding the friction ground member 86.

Operation of the Transfer Case

With particular reference to FIGS. 1 and 2 and other figures as noted, the operation of the transfer case 10 of the present invention will be explained. First, high range operation is discussed.

High Range Mode

The basic purpose of the transfer case is to receive torque at the input shaft 24 and distribute torque between the front and rear axles based upon conditions to which the vehicle is subjected. Under simple operating conditions when the transfer case is in high range mode (as shown in FIG. 1) and the vehicle is traveling straight and at moderate speed along a level, high-friction surface (e.g. asphalt) the drive line of the vehicle will proceed directly from the input shaft 24 to the first output shaft 26. Under these conditions, the road surface rotates the front wheels at substantially the same rate of speed as the rear wheels due solely to their contact with the ground surface. The second output shaft 28 is in direct drive relationship with the front wheels.

Various vehicle and environmental conditions affect the drive path. For example, in a front-engine vehicle, the rear wheels may slip on the road surface more than the front wheels, even on normal, level road surfaces. Thus, the inner race 70 located on the first output shaft 26 will attempt to rotate faster than the outer race 78 thereby causing the roller clutch to engage. Under these circumstances, the torque is directed primarily to the front axle.

In a rear-engine vehicle, or a vehicle towing a trailer, the rear wheels may not slip more than the front. Without rear wheel slip, the inner race generally would not attempt to rotate faster than the outer race and the clutch normally would not engage. Thus, the torque would be primarily directed to the rear axle.

When the vehicle turns through a corner, the front wheels can rotate faster than the rear wheels thus causing the outer race 78 to overrun the inner race 70. Conversely, if the rear wheels slip due to a low friction surface, or other cause, the clutch 20 will engage and transfer input torque to the front axle.

In high range mode, the internal splines of collar 56 directly engage splines 52 and 64 on shafts 24, 26, respectively (FIG. 1). Thus, input torque delivered to the input shaft 24 is transferred directly to the first output shaft 26 by virtue of the direct connection. When the coupling mechanism is in the high-range position (FIG. 1), the biasing spring 156 urges the locking hook 112 into one of the pockets 88 of the friction ground 86, grounding it. Because the friction ground 86 is journaled on the first output shaft 26, it remains stationary while the first output shaft 26 rotates within it.

Figure 4:
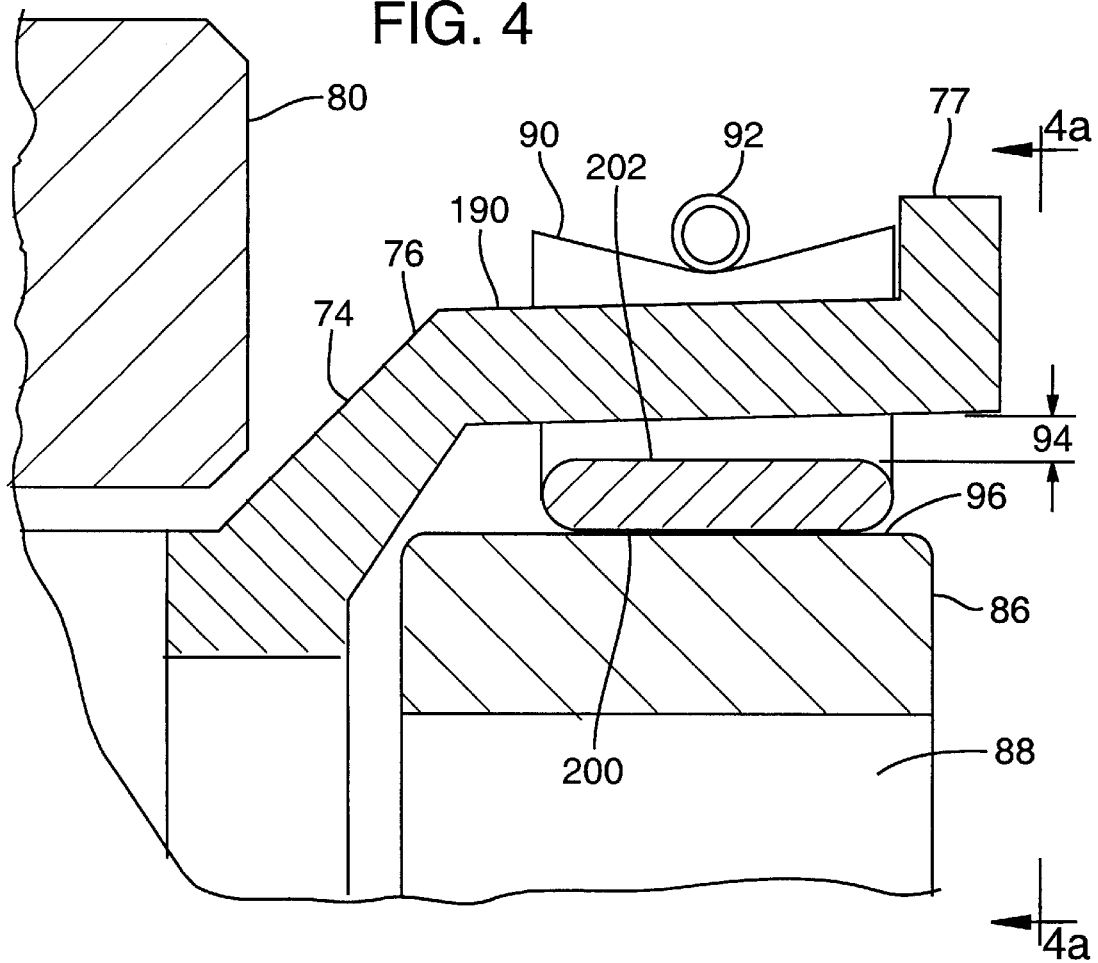
FIG. 4 is an enlarged detailed view of a cross section of a modulated drag shoe of a preferred embodiment of an overrunning roller clutch of the transfer case of FIG. 1.
Figure 4A:
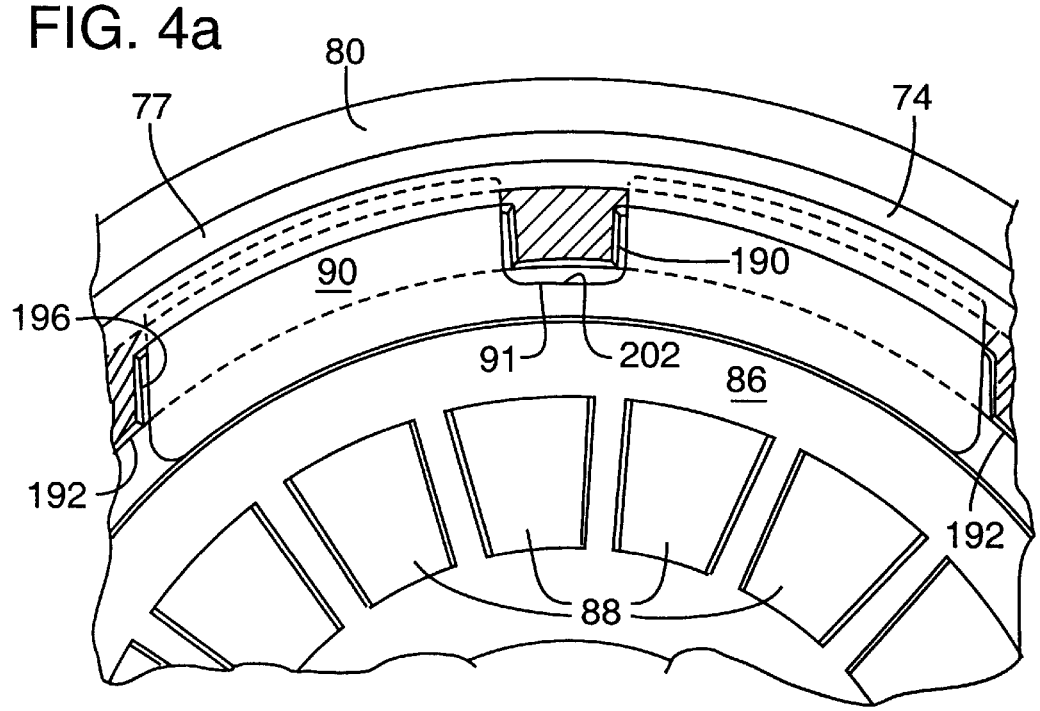
FIG. 4a is a partial elevation view of a drag shoe and grounding member as seen from line A—A in FIG. 4.

The drag shoes 90 rest upon the drag surface 96 of the friction ground 86 and rotate with the rollers and roller cage. As the roller clutch assembly rotates, the drag shoes 90 drag across the drag surface 96. The garter spring 92 provides an inwardly directed radial force thus urging the shoes 90 against the drag surface 96 (FIG. 4).

The operation of the system is speed dependent. As the rotational velocity of the first output shaft 26 increases, the system changes thus creating different dynamics between the system components.

When the first output shaft 26 rotates at a low rotational velocity, the drag shoes 90 rest upon, and drag across the stationary friction ground 86.

Assuming that the vehicle is traveling straight along a flat road having good surface friction, the inner race 70 and outer race 78 are rotating at substantially the same rotational velocity. The drag shoes 90 drag across the drag surface 96 of the grounded friction ground 86 creating a drag force that acts on the cage 74 to retard the rollers so that the outer race 78 is free to overrun the inner race at any time. It is particularly important that the outer race 78 be able to overrun the inner race at lower speeds as this is when the sharpest turning occurs. Additionally, with the rollers retarded, they are in a position to quickly engage in the event that the inner race 70 rotates faster than the outer race as is common when an operator attempts to move the vehicle from a low friction position, such as when the rear wheels are located on ice or sand. Accordingly, when attempting to move forward from a stopped position and the rear wheels slip, the roller clutch will engage very quickly with very little relative movement between the inner and outer races and thus quickly transfer torque to the front axle.

As the vehicle moves faster and the first and second output shafts 26, 28 begin to achieve a higher rotational velocity, the drag shoes 90 likewise rotate faster and a centrifugal force acts radially outwardly on the shoes in opposition to the force of the garter spring 92. As noted, there is a gap 94 between the upper surface 202 of the shoes 90 and the roller cage skirt 76 thus providing space into which the shoes can move. As the rotational velocity increases, the centrifugal force increases proportionally and the shoes start to lift off of the friction surface 96 thus reducing the amount of drag force that acts on the cage 74 and rollers 72. The amount of force on the rollers is less necessary at higher speeds because the vehicle is substantially less likely to make sharp turns and rear wheel slip is not as likely once the vehicle is moving at a substantial speed.

Reducing the friction force of the drag shoes at high speed is beneficial because less heat is generated between the surfaces and less frictional wear occurs. A greater range of materials may be used for the friction ground 86 and the shoes 90 due to the reduction in frictional wear and heat produced. This promotes longer useful life for the operating components in this part of the system.

The factors that influence the separation of the shoes from the friction ground include the spring rate of the garter spring 92, the initial spring tension, the mass of the shoes 90, the radius of the shoes 90 from the center of rotation, and the speed of rotation. In the current embodiment, the shoes 90 are designed to separate completely from the friction ground 86 at approximately 80 miles per hour (plus or minus 10 miles per hour). At typical highway speeds, the shoes 90 will have begun to lift away from the friction ground 86 and the force retarding the rollers due to the drag shoes 90 will be reduced.

The drag ring 84 moves with the outer race 78 and urges the roller cage 74 to advance. When the drag shoes 90 are frictionally sliding on friction ground 86 the drag force so generated by the drag shoes far exceeds the force of the drag ring on the roller cage. Thus, the drag ring does not cause the rollers to advance when the drag shoes are engaged with the drag surface 96. However, when the shoes are off the drag surface and the outer race rotates faster than the inner race (front wheels moving faster than the rear wheels) then the drag ring 84 will urge the rollers to advance toward their advanced engagement position thereby engaging the roller clutch.

When lock-up occurs in previously known roller clutches, the roller clutch assembly could remain engaged even when the vehicle returned to lower speeds. Such lock-up can be particularly noticeable when a vehicle is traveling along a highway and the roller clutch engages in the advanced engagement position and thereafter the vehicle exits the highway onto a down ramp, stops and makes a sharp turn onto a side road. This condition can be disconcerting to the vehicle operator if the roller clutch remains engaged. The latch 100 will prevent such lock-up.

Mounted on the first output shaft 26, the latch 100 rotates with the shaft. At lower velocities, the latch arms 104 are retracted by the springs 107 into a nonengaged configuration as is shown in solid outline in FIG. 3a. As the velocity of the first output shaft increases, the arms 104 are urged outward due to the centrifugal force created by the rotation of the shaft. With sufficient centrifugal force exerted, the arms move far enough that the tabs 109 will engage the cage 74 at the keyways 180 (as shown in dashed line 111 for one of the arms) thus coupling the roller cage 74 to the first output shaft 26 so that the cage rotates with the output shaft 26. The keyways 180 are arranged relative to the roller openings 178 so that the latch arms 104 engage the cage 74 when the rollers are approximately halfway between the retarded engaged position and the advanced engaged position The trailing end of each keyway 180 has the beveled end 186 so that if the inner race begins to overrun the outer, the tabs 109 will encounter the beveled ends and easily slip past the keyway to allow the cage and rollers to retard so the clutch can lock. Thus, the beveled end permits the clutch to engage in the retarded position, but prevent engagement in the advanced position.

Neutral

The coupling mechanism 18 has an intermediate position between high and low range, shown partially in dashed line in FIG. 2, in which the first output shaft 26 is not engaged to either the input shaft 24 or to the gear reduction assembly 16. In this position the locking hook 112 is engaged with the friction ground to ensure that the drag shoes 90 bias the rollers so that the clutch assembly 20 continues to operate as an overrunning clutch. This position is particularly useful for situations in which the vehicle is being towed.

Low Range Mode

When the coupling mechanism 18 is moved into low range as shown in solid line in FIG. 2, collar 56 connects the spline portion 64 of the first output shaft 26 with the carrier 44 of the planetary gear 36. This causes the first output shaft 26 to rotate slower than the input shaft 24. As the actuator assembly 22 moves the collar 56 it also forces the locking hook 112 out of engagement with the friction ground 86. The friction ground 86 remains frictionally coupled to the drag shoes 90 and is now free to rotate with the output shaft 26 and the roller clutch assembly 20. When the friction ground is thus ungrounded, the drag surface 96 rotates and the drag shoes 90 provide no drag force to retard the roller cage and rollers. Thus the clutch 20 has no substantial overrunning function during low range operation.

It has been found beneficial to have the vehicle in full-time four wheel drive mode when the vehicle is in low range and operating on rough or lose terrain. Without the biasing force on the rollers, all relevant movement between the inner race 70 and outer race 78 will cause the roller clutch to engage so that forces on the faster axle drive the slower axle. This is particularly beneficial when, for example, the vehicle is in low range mode and going forward down a steep embankment having a lose ground surface. The front wheels can provide compression braking to the rear wheels when the roller clutch is thus engaged.

The drag ring 84 is further effective in this configuration because it tends to advance the rollers into engagement when the outer race 78 is moving faster then the inner race. Without the drag ring 84 there may be situations in which the rollers could be retarded so that the front wheels would overrun the rear wheels and not provide any compression braking.

Actuator Operation

As mentioned, the actuator assembly 22 provides the force to move the collar 56 of the coupling mechanism 18 between high range, low range and neutral. The actuator motor 122 (FIG. 5) rotates the sun gear 126 of the planetary gear 124. Rotation of the sun gear 126 rotates planet gears 128 which thus cause the floating annular ring 132*a* to rotate. Attached to the annular ring is the pin drive device 138 having the drive pins 140. As can best be seen in FIGS. 6*a*–6*c*, the drive pins 140 engage notches 144 in the shift rail 146. Because the pin drive device 138 is fixed along its center of rotation, rotating the pin drive device 138 will cause a drive pin 140 to engage the notch and force the shift rail longitudinally to the left or right (depending upon the direction of rotation).

Figure 6A:
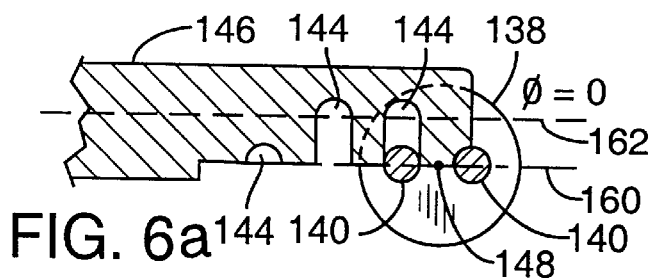
FIGS. 6a, 6b, and 6c show detailed cross-sectional views of an actuator and pin drive mechanism as viewed along line 6—6 of FIG. 2.
Figure 6B:
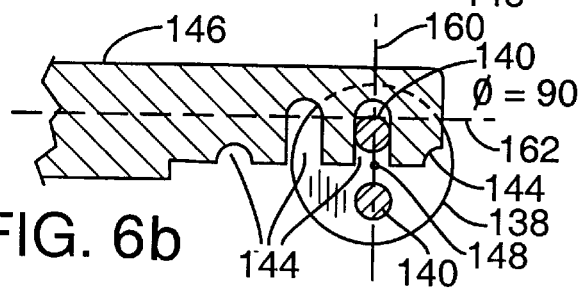

In FIG. 6*a*, the shift rail 146 and pin drive device 138 are shown in the position which would cause the coupling mechanism 118 to be in the high range position. Thereafter, rotating the pin drive device 138 in the clockwise direction (as viewed from FIGS. 6*a*–6*c*) causes a drive pin 140 to engage a notch 144 to force the shift rail longitudinally to the right.

For the following explanation of the operation, it is necessary to set up references axes. Accordingly, a drive pin axis 160 extends transversely through the centers of drive pins 140*a* and 140*b* and central axis 148. A longitudinal axis 162 is defined extending longitudinally through the shift rail 146. An angle is formed between the drive pin axis 160 and the longitudinal axis 162, defined as phi (φ).

Figure 6C:
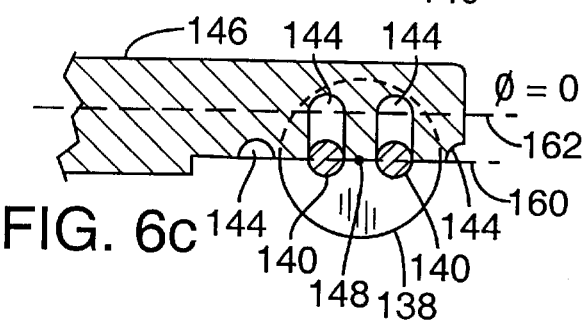
Figure 7:
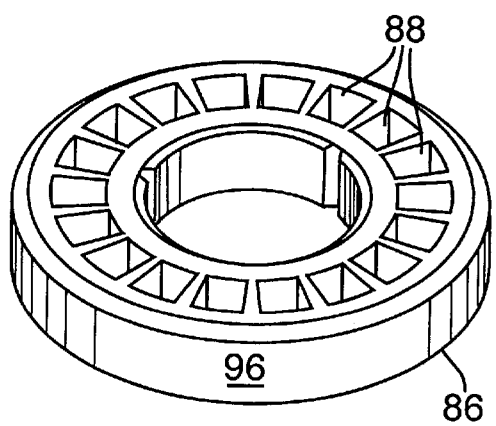
FIG. 7 is a perspective view of a friction ground of the present invention.

As noted, the configuration of the pin drive device 138 and shift rail 146 as shown in FIG. 6*a* represent the actuator when the coupling mechanism is in the high range position. In this configuration, φ=0. As the pin drive device 138 begins to rotate clockwise, φ likewise increases and drive pin 140*a* slowly begins to move the shift rail. When the pin drive device 138 gets to the position as shown in 6*b* where φ=90°, the shift rail is being moved more quickly even while the drive pin device 138 maintains a constant rotational velocity. As the pin drive device rotates another 90° and reaches the position as shown in FIG. 6*c*, φ again approaches 0° and the actuator mechanism is in the position corresponding to the neutral position for the coupling mechanism 18. When φ is approximately 0°, rotating the pin drive device 138 produces little motion of the shift rail 146. When φ is approximately 90°, an identical amount of rotation of the pin drive device 138 produces substantially greater longitudinal motion of the shift rail 146. Accordingly, it can be seen that the relationship between the speed of the shift rail 146 is proportionate to the sine of φ. The shift rail velocity is equal to $\omega \cdot R \cdot \sin \phi$, where $\omega$ is the rotational velocity of the pin drive device 138, and R is the effective radius of the drive pins 140 from the center of rotation 148 of the pin drive device.

This relationship is beneficial for several reasons. When the actuator is moving and the coupling device 18 is approaching one of the three positions (high, low or neutral), φ will approach zero. Accordingly, the movement of the shift rail will not as be sensitive to slight motions of the pin drive device 138, thus making it easier to accurately sense and stop the actuator assembly 22 when the coupling mechanism has reached the desired position.

Conversely, system speed is greatest when φ is approximately 90°. Thus, the actuator mechanism is able to move the shift rail 146 quickly between positions but naturally slows as φ reaches zero, which corresponds to the shift rail reaching a desired position. The position represented in FIG. 6*c* represents the neutral position of the coupling mechanism 18. Rotating the pin drive device 138 another 180° clockwise from FIG. 6*c* would correspond with moving the coupling of mechanism into the low range position.

Numerous characteristics and advantages of the invention have been set forth in the foregoing description, together with the details of the structure and function of the invention. The novel features hereof are pointed out in the appended claims. The disclosure is illustrative only, and changes may be made in detail, especially in matters of shape, size and arrangement of parts within the principle of the invention to the full extent indicated by the broad general meaning of the terms in the claims.

What is claimed is:

1. A transfer case, comprising:
   (a) a housing:
   (b) an input shaft rotatably coupled to the housing;
   (c) an output shaft rotatably coupled to the housing;
   (d) a torque transfer mechanism operable to impart first and second torque transfer conditions between the input and output shafts;
   (e) a movable shifter mechanism operable to selectively shift between said first and second torque transfer conditions; and
   (f) and an actuator for moving the shifter mechanism, the actuator including a power source, a pin drive device defining an axis of rotation and having at least two elongate drive pins extending substantially parallel to and arranged to translate circumferentially about the axis of rotation as the pin drive device rotates, and a shift rail having a plurality of notches positioned to be engaged by the drive pins, whereby the power source rotates the pin drive device about the axis of rotation, the drive pins translate circumferentially about the axis of rotation and at least one drive pin engages at least one notch and urges the shift rail to move longitudinally thereby moving the shifter mechanism.

2. The transfer case of claim 1 wherein a line extending between the two drive pins defines a pin axis that extends substantially normal to the elongate drive pins and passes through a center of the drive pins, the shift rail has a longitudinal axis, the pin axis and the longitudinal axis define an angle of incidence therebetween, and the velocity of the shift rail is proportionate to speed of rotation of the drive pins and the sine of the angle of incidence.

3. The transfer case of claim 1 wherein the power source is a motor having a substantially constant rotational velocity, a line extending between the two drive pins defines a pin axis that extends substantially normal to the elongate drive pins and passes through a center of the two drive pins, the shift rail defines a longitudinal axis, the velocity of the shift rail is greatest when the pin axis is substantially normal to the longitudinal axis and the velocity of the shift rail is least when the pin axis is substantially parallel to the longitudinal axis.

4. The transfer case of claim 1 wherein the shifter mechanism has first and second positions, the first position couples the first output shaft to the torque transfer mechanism and the second position decouples the first output shaft from the torque transfer mechanism, and a line extending between the two drive pins defines a pin axis that is substantially normal to the elongate drive pins and passes through a center of the two drive pins, the shift rail has a longitudinal axis, the pin axis and the longitudinal axis define an angle of incidence therebetween, and when the shifter mechanism is in the first and second positions the angle of incidence is substantially zero.

5. The transfer case of claim 1 wherein the shifter mechanism has first, second, and third positions, the first position couples the first output shaft to the torque transfer mechanism, the second position decouples the first output shaft from the torque transfer mechanism, and the third position couples the first output shaft to the input shaft, and two of the drive pins define a pin axis that is substantially orthogonal to the elongate drive pins and passes through a center of the two drive pins, and the shift rail defines a longitudinal axis, and the pin axis and the longitudinal axis define an angle of incidence therebetween, and the when the shifter mechanism is in the first, second, and third positions the angle of incidence is substantially zero degrees.

6. The transfer case of claim 1 wherein the shift rail has four notches defined therein for engaging the drive pins.

7. The transfer case of claim 1 further comprising a shift fork compliantly coupled to the shift rail and coupled to the shifter mechanism, wherein longitudinal motion of the shift rail urges the shift fork to move which in turn moves the shifter mechanism.

8. The transfer case of claim 1 further comprising a selectively grounded friction collar, at least one friction shoe that drags against the collar, and a locking device that engages and grounds the friction collar, wherein the locking device is coupled to the actuator so that motion associated with the actuator engages and disengages the locking device and the friction collar.

9. The transfer case of claim 1, which further comprises a selectively groundable member which may be either rotatable or grounded against rotation, a locking device shiftable between a first position engaging and grounding said grounding member and a second position permitting rotation of the groundable member, and the locking device is coupled to the actuator so that motion of the actuator shifts the locking device between said first and second positions.

10. The transfer case of claim 1, which further comprises a compliant coupling between the shifter mechanism and the actuator so that operation of actuator urges the shifter mechanism to move when movement of the shifter mechanism is unobstructed.

11. The transfer case of claim 1 further comprising a roller clutch, and a second output shaft coupled to the first output shaft through the roller clutch, the roller clutch including a biasing device ground member and a locking device that engages the ground member to ground it and disengages the ground member to unground it, the locking device being coupled to the actuator wherein movement of the actuator moves the locking device thereby engaging and disengaging the locking device with the ground member.

12. A transfer case for a vehicle, comprising:
(a) a housing;
(b) an input shaft rotatably coupled to the housing;
(c) a torque transfer mechanism coupled to the input shaft;
(d) a first output shaft;
(e) a shift collar moveable between a first position that couples the first output shaft to the input shaft and a second position that couples the first output shaft to the torque transfer mechanism;
(f) an actuator for moving the shift collar between the first and second positions, the actuator including a motor, a drive pin mechanism and an elongate shift rail, whereby energization of the motor rotates the drive pin mechanism which longitudinally translates the shift rail to move the shift collar between the first and second positions.

13. The transfer case of claim 12 further comprising a compliant spring coupling the shift rail to the shift collar so that longitudinal movement of the shift rail acts on the spring, the spring urges the shift collar to move, and the shift collar so moves when its motion is unobstructed.

14. The transfer case of claim 12 wherein the drive pin mechanism includes a sun gear, planet gears located on a carrier and a fixed annular gear, the carrier having an axis of rotation and including a plurality of elongate pins arranged substantially parallel to the axis of rotation and spaced apart from the axis of rotation so that the pins translate about the axis of rotation as the carrier rotates, and wherein the shift rail includes a plurality of notches for receiving the pins so that rotation of the carrier moves the pins about the axis of rotation and the pins engage the notches thereby longitudinally moving the shift rail to urge the collar to move.

15. The transfer case of claim 12 further including a shift fork coupled to the shift rail and shift collar, and movement of the shift rail urges the shift fork to move to produce movement of the shift collar.

16. The transfer case of claim 12 further comprising a selectively groundable member and a locking member, the locking member being coupled to, and movable with, the shift rail wherein the locking member engages and secures the groundable member in a grounded position when the shift rail has moved the collar into one of said first and second positions, and the locking member is disengaged from the groundable member when the shift rail has moved the collar into the other of said first and second positions.

17. The transfer case of claim 12 further comprising a shift fork, a locking member, a second output shaft and a roller clutch that selectively engages the first output shaft to the second output shaft, the roller clutch including cam elements and a selectively grounded friction ground for biasing the cam elements, wherein the shift fork is coupled to the shift collar and the shift rail and the locking member and when the shift collar is in the first position the locking member is engaged with the friction ground thereby grounding the friction ground and when the shift collar is in the second position the locking member is disengaged from the friction ground so that the friction ground is ungrounded.

18. The transfer case of claim 12 wherein the torque transfer mechanism comprises a planetary gear assembly having a splined connector portion and the shift collar comprises a splined sleeve is movable into and out of engagement with the planetary gear assembly.

19. The transfer case of claim 12 wherein the shift rail includes first, second, third and fourth notches and the gear reduction unit includes a carrier having two laterally spaced pins extending therefrom and when the two pins are engaged with the first and second notches the collar is in the first position and when the two pins are in the third and fourth notches the collar is in the second position.

20. The transfer case of claim 12 wherein the shift rail includes first, second, third and fourth notches and the gear reduction unit includes a carrier with two pins extending therefrom and when the two pins are engaged with the first and second notches the collar is in the first position and when the two pins are in the third and fourth notches the collar is in the second position, and wherein the second and third notches have a depth into the shift rail that is greater than a depth associated with the first and fourth notches.

21. The transfer case of claim 12 wherein the pins extend substantially normal to the elongate shift rail.

22. A transfer case for a vehicle drive train that transfers rotational torque from a power source to drive wheels, the transfer case comprising:

(a) a housing;

(b) an input shaft adapted to receive rotational torque from the power source;

(c) a torque transfer mechanism coupled to the input shaft (d) a first output shaft selectively coupled to the input shaft or the torque transfer mechanism (e) a shift actuator having at least two drive pins that translate about a common axis of rotation, an elongate shift rail that is engaged by the drive pins and is moved longitudinally thereby when the drive pins rotate about the axis of rotation to selectively couple the first output shaft to the torque transfer mechanism or the input shaft.

23. The transfer case of claim 22 further comprising a shift collar that slides between a first position that couples the first output shaft to the input shaft and a second position that couples the first output shaft to the torque transfer mechanism and wherein the shift rail is coupled to the shift collar so that longitudinal movement of the shift rail moves the shift collar between the first and second positions.

24. The transfer case of claim 22 further comprising a shift collar that slides between a first position that couples the first output shaft to the input shaft and a second position that couples the first output shaft to the torque transfer mechanism, and shift fork coupled to the shift collar and the shift rail and wherein longitudinal movement of the shift rail moves the shift fork that moves and shift collar between the first and second positions.

25. The transfer case of claim 22 further comprising a shift collar that slides between a first position that couples the first output shaft to the input shaft and a second position that couples the first output shaft to the torque transfer mechanism, shift fork coupled to the shift collar and the shift rail, and a compliance spring coupled between the shift rail and the shift fork wherein longitudinal movement of the shift rail creates potential energy in the compliance spring that urges the shift fork and shift collar to move and the shift fork and shift collar so move when the shift collar has an unimpeded movement path.

26. The transfer case of claim 22 further comprising a second output shaft and a roller clutch coupled to the first and second output shafts, the roller clutch including first and second races and roller bearings located between the first and second races, the roller bearings having an engagement position that couples the first and second races, the roller clutch further including at least one shoe and a selectively grounded friction ground, the transfer case further comprising a grounding hook coupled to the shift rail, whereby movement of the shift rail moves the grounding hook between first and second positions that ground and unground the friction ground, respectively.

27. The transfer case of claim 22 further comprising a second output shaft and a roller clutch coupled to the first and second output shafts, the roller clutch including first and second races and roller bearings located between the first and second races, the roller bearings having an engagement position that couples the first and second races, the roller clutch further including a selectively grounded friction ground and at least one shoe that is coupled to the bearings and when the friction ground is grounded the at least one shoe frictionally bears on the friction ground to bias the bearings out of the engagement position, the transfer case further comprising a grounding hook coupled to the shift rail, whereby movement of the shift rail moves the grounding hook between first and second positions that ground and unground the friction ground, respectively.

28. The transfer case of claim 22 further comprising a second output shaft and a roller clutch coupled to the first and second output shafts, the roller clutch including first and second races and roller bearings located between the first and second races, the roller bearings having an engagement position that couples the first and second races, the roller clutch further including a selectively grounded friction ground and at least one shoe that is coupled to the bearings and when the friction ground is grounded the at least one shoe frictionally bears on the friction ground to bias the bearings out of the engagement position, the transfer case further comprising a grounding hook coupled to the shift rail, whereby movement of the shift rail moves the grounding hook between first and second positions that ground and unground the friction ground, respectively, and wherein the torque transfer mechanism is a planetary gear and when the first output shaft is coupled to the input shaft the transfer case is in high gear and the grounding hook is in the first position that grounds the friction ground and when the first output shaft is coupled to the planetary gear the transfer case is in low gear and the grounding hook is in the second position that ungrounds the friction ground.

* * * * *